United States Patent [19]
Roberts et al.

[11] 3,805,017
[45] Apr. 16, 1974

[54] RADOME ANTI-ICING SYSTEM

[75] Inventors: Donald J. Roberts, Claremont;
David L. Feasby, Pomona, both of Calif.

[73] Assignee: General Dynamics Corporation, Pomona, Calif.

[22] Filed: July 17, 1972

[21] Appl. No.: 272,236

[52] U.S. Cl................................ 219/213, 343/704
[51] Int. Cl. ............................................. H05b 1/00
[58] Field of Search................. 219/200, 201, 209, 219/213, 544; 343/704, 872 R

[56] References Cited
UNITED STATES PATENTS
3,146,449  8/1964  Serge et al.......................... 343/704
2,712,604  7/1955  Thomas, Jr. et al. ............ 343/704 X Primary Examiner—C. L. Albritton
Attorney—Edward B. Johnson

[57] ABSTRACT

An anti-icing system is disclosed for radomes in which the radar transparent radome is coated with a thermally conductive material over resistive heating elements. The invention herein described was made in the course of or under a contract or subcontract thereunder, with the Department of the Navy.

11 Claims, 4 Drawing Figures

TEMPERATURE
CONTROL UNIT

PATENTED APR 16 1974 3,805,017

22
TEMPERATURE
CONTROL UNIT

RADOME ANTI-ICING SYSTEM

BACKGROUND OF THE INVENTION

Enclosures for radiant electrical energy transmitting and/or receiving apparatus such as radar equipment, commonly referred to as radomes, are often exposed to weather or altitude conditions which can lead to icing of the exterior surface of the radome. The continual accumulation of ice can interfere with signal propagation and thus seriously diminish operating efficiency. In extreme cases, severe maintenance and even structural problems can be encountered.

While heating of the radomes has been proposed, none of the methods developed to date have proven to be satisfactory, basically because most radome materials, which must be radar transparent, are inherently very poor thermal conductors.

SUMMARY OF THE INVENTION

The invention is directed towards an anti-icing system for radomes. Resistive elements wound circumferentially around the radome generate heat when an electrical current is passed there through and this heat is distributed throughout the outer surface of the radome by a thermally conductive coating over the resistive elements and radome.

DESCRIPTION OF THE PREFERRED EMBODIMENTS

Figure 1:
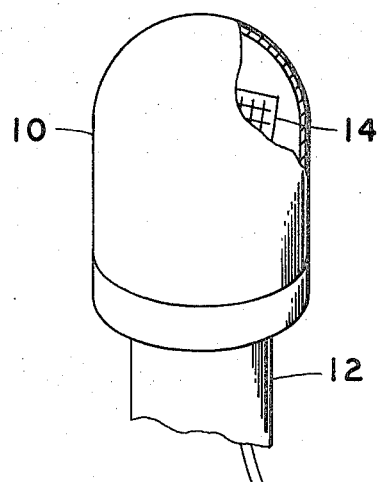
FIG. 1 is a schematic representation of a radome structure partially cut away to illustrate the anti-icing radome construction of the present invention.

In FIG. 1, there is illustrated a radome structure for radiant electrical energy transmitting and/or receiving apparatus such as radar equipment. The radar window or radome 10 including the anti-icing structure is mounted on a base 12. The base 12 can in turn be mounted on a topside ship compartment (not shown) housing the radar operating equipment and personnel. Situated inside the radome 10 would be a radar antenna 14.

Figure 2:
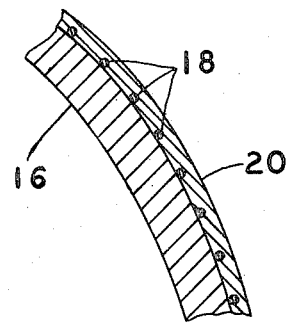
FIG. 2 is an enlarged section of the anti-icing radome construction of the present invention.

As more clearly shown in FIG. 2, the radome anti-icing structure basically comprises the radar transparent structural member 16, resistive heating elements 18 circumferentially wound around the outer surface of the radar transparent material 16, and a thin outer coating 20 of a thermally conductive, radar transparent, material over the heating elements 18 and the outer surface of the structural member 16.

The structural member 16 can be constructed of any radar transparent material such as fiberglass or other glass cloth sheet material impregnated with a thermosetting resin which is easily formable while wet and is curable in situ to a rigid final shape. Such materials, while they are readily transparent to radiant energy, are inherently poor conductors of heat energy.

The resistive heating elements, which can, for example, be wires, photoetched circuits, or the like are circumferentially wound around the structural member 16 to reduce attenuation of the radar signal. The spacing between the individual resistive heating elements is defined by the radar frequency to prevent significant radar attenuation and/or interference.

In order to uniformly distribute the heat generated by the resistive elements 18 when electrical current is supplied thereto, the elements 18 and the outer surface of the structural member 16 are provided with a thin coating 20 of a thermally conductive, radar transparent material such as alumina, pyroceram, beryllia, or boron nitride. The resistive elements 18 may alternatively be embedded in the coating 20. The thickness of the coating 20 would be dependent upon the size of the resistive elements 18 and must be sufficient to meet the heat dissipation requirements for the intended environment yet must not interfere with the basic radar requirements. By way of example, a 25 thousandths thickness of alumina has been found functionally satisfactory with 10 thousandths (30 gauge) nichrome wire spaced approximately at ½ inch intervals.

In operation, electrical current from an available power source (not shown) is provided to the resistive elements 18. A temperature control unit 22, of the thermostatic or proportioned control type, dependent upon the system requirements, can be provided if required. As the resistive elements 18 generate heat, this heat is conducted along the entire outer surface of the structural member 16 by the thermally conductive coating 20. The formation of ice is prevented by uniformly maintaining the surface temperature above the freezing temperature of water.

This system permits the use of radar systems under all environmental conditions, even severe shipboard conditions which can have an ambient as low as −20°F and an induced wind velocity of 50 knots. Both the power requirements and the radar signal attenuation and interference are minimized. Since there are no moving parts, the reliability of the anti-icing system permits continuous operation to ensure an ice free radome at all times. The system is also light in weight, requires very little space and is remarkably simple in design compared to the other radome anti-icing systems. Ships which operate in cold climates are particularly susceptible to icing conditions with ocean spray due to rough seas. Under these conditions, a radar system could be enclosed in a radome with the anti-icing system thermostatically controlled to activate whenever the dome temperature falls below 30°F.

Figure 3:
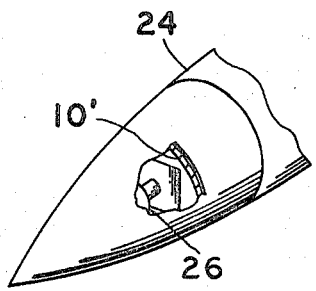
FIG. 3 is a schematic representation of an aircraft radome installation having the anti-icing system of the present invention.
Figure 4:
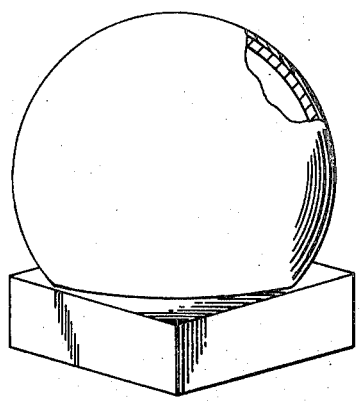
FIG. 4 is a schematic representation of a ground radome installation having the anti-icing system of the present invention.

Because of these unique qualities, the radome anti-icing system of the present invention is ideally suited to many applications in addition to the shipboard use already discussed. For example, the system can easily be applied to airborne installations as shown in FIG. 3. The radome 10' can be incorporated in the aircraft nose 24 around an antenna 26. The resistive elements and coating would be provided around the structural member as previously discussed with respect to FIG. 2. As shown in FIG. 4 the same anti-icing system can be adapted for use in a ground installation.

While specific embodiments of the invention have been illustrated and described, it is to be understood that these embodiments are provided by way of example only and the invention is not to be construed as

What we claim is:

1. An anti-icing system including a radar enclosing radome the improvement comprising:
   a radar transparent structural member disposed to enclose a radar;
   resistive heating elements disposed around the outer surface of said radar transparent structural member; and
   a thermally conductive, radar transparent, coating disposed over the resistive heating elements and the outer surface of the radar transparent structural member to uniformly distribute heat from the resistive heating elements over the entire outer surface of said radome.

2. The radome anti-icing system of claim 1 wherein said radar transparent structural member is generally cylindrically shaped with a hemispherical upper end and said resistive heating elements are generally circumferentially wound around the structural member.

3. The radome anti-icing system of claim 1 wherein said radar transparent structural member is generally conically shaped and said resistive heating elements are generally circumferentially wound around the structural member.

4. The radome anti-icing system of claim 1 wherein said radar transparent structural member is generally spherically shaped and said resistive heating elements are generally circumferentially wound around the structural member.

5. The radome anti-icing system of claim 1 and in addition a power source to provide electrical energy to said resistive heating elements and means to control the provision of electrical energy to said resistive heating elements.

6. The radome anti-icing system of claim 5 wherein said control means is thermostatically operative.

7. The radome anti-icing system of claim 1 wherein said radar transparent structural member is formed from an impregnated glass cloth material.

8. The radome anti-icing system of claim 1 wherein said resistive heating elements are of nichrome wire.

9. The radome anti-icing system of claim 1 wherein said resistive heating elements are photoetched circuits.

10. The radome anti-icing system of claim 1 wherein said coating is of alumina.

11. An anti-icing system including a radar enclosing radome the improvement comprising:
    a radar transparent structural member enclosing the radar;
    a thermally conductive, radar transparent coating disposed around the entire outer surface of said structural member; and
    resistive heating elements operably associated with said coating to substantially uniformly heat said coating to prevent the formation of ice thereon.

* * * * *